(12) United States Patent
Kim

(10) Patent No.: US 8,876,135 B2
(45) Date of Patent: Nov. 4, 2014

(54) COMBINED-DRIVE BICYCLE

(76) Inventor: Hakyoon Kim, Goyang-si (KR)

( * ) Notice: Subject to any disclaimer, the term of this patent is extended or adjusted under 35 U.S.C. 154(b) by 291 days.

(21) Appl. No.: 13/379,687

(22) PCT Filed: Jul. 14, 2010

(86) PCT No.: PCT/KR2010/004558
§ 371 (c)(1),
(2), (4) Date: Dec. 21, 2011

(87) PCT Pub. No.: WO2011/008014
PCT Pub. Date: Jan. 20, 2011

(65) Prior Publication Data
US 2012/0104723 A1 May 3, 2012

(30) Foreign Application Priority Data
Jul. 17, 2009 (KR) .................. 10-2009-0065606

(51) Int. Cl.
*B62M 1/12* (2006.01)
*B62M 17/00* (2006.01)

(52) U.S. Cl.
CPC *B62M 1/12* (2013.01); *B62M 17/00* (2013.01)
USPC .................. 280/234; 280/230; 280/233

(58) Field of Classification Search
USPC .................. 280/224, 230, 232–234
See application file for complete search history.

(56) References Cited

U.S. PATENT DOCUMENTS

| | | | | |
|---|---|---|---|---|
| 384,150 A * | 6/1888 | Goodsell | ............ | 280/234 |
| 484,712 A * | 10/1892 | Hartley | ............ | 280/234 |
| 528,423 A * | 10/1894 | Ferguson | ............ | 280/234 |
| 646,161 A * | 3/1900 | Atkinson | ............ | 280/234 |
| 690,180 A * | 12/1901 | Pierson | ............ | 280/234 |
| 1,577,321 A * | 3/1926 | Kurth | ............ | 280/234 |
| 3,906,807 A * | 9/1975 | Trammell, Jr. | ............ | 74/143 |
| 4,417,742 A * | 11/1983 | Intengan | ............ | 280/234 |
| 4,685,692 A | 8/1987 | Fullilove et al. | | |
| 5,158,314 A * | 10/1992 | Farras Pinos | ............ | 280/259 |
| 5,328,195 A * | 7/1994 | Sommer et al. | ............ | 280/233 |
| 5,785,336 A * | 7/1998 | Jang | ............ | 280/234 |
| 2002/0180175 A1* | 12/2002 | Christini et al. | ............ | 280/230 |
| 2008/0238021 A1 | 10/2008 | Cynn | | |

FOREIGN PATENT DOCUMENTS

| | | |
|---|---|---|
| KR | 10-2005-0079994 | 8/2005 |
| KR | 10-2006-0127588 | 12/2006 |
| KR | 10-0840262 | 6/2008 |

* cited by examiner

*Primary Examiner* — Anne Marie Boehler
*Assistant Examiner* — Maurice Williams
(74) *Attorney, Agent, or Firm* — Sherr & Jiang, PLLC

(57) ABSTRACT

There is disclosed a combined-drive bicycle which can increase a driving speed and the beneficial effects of exercise and simultaneously to give fun to a rider. The combined-drive bicycle includes a handle assembly configured to steer a front wheel, the handle assembly comprising a crank handle to generate a handle motive force and a first gear rotated by the rotation of the crank handle, a pedal assembly configured to transmit the handle motive force and a pedal motive force generated by pedals to a rear wheel selectively or simultaneously, and a motive force transmission part to transmit the handle motive force to the pedal assembly, irrelevant to the steering of the handle assembly.

18 Claims, 13 Drawing Sheets

(a)  (b)  (c)

COMBINED-DRIVE BICYCLE

CROSS REFERENCE TO PRIOR APPLICATIONS

This application is a National Stage Patent Application of PCT International Patent Application No. PCT/KR2010/004558 (filed on Jul. 14, 2010) under 35 U.S.C. §371, which claims priority to Korean Patent Application No. 10-2009-0065606 (filed on Jul. 17, 2009), which are all hereby incorporated by reference in their entirety.

BACKGROUND

The present invention may relate to a combined-drive bicycle, more particularly, to a combined-drive bicycle which can increase a driving speed and the beneficial effects of exercise and simultaneously to give fun to a rider.

Generally, a bicycle is a vehicle with two wheels which a person rides by sitting on it and pushing two pedals with his or her feet and which he or she steers by turning a bar connected to the front wheel with the hands.

In an aspect of the user's exercise, the beneficial effects of leg exercise are great and the beneficial effects of arm exercise are little. Also, the driving speed is limited.

In the meanwhile, to overcome such a disadvantage, there have been efforts at improvement of the structure of the bicycle to enable the rider to use his or her arms and legs multiply in riding the bicycle.

However, even an improved bicycle might have a disadvantage such as a complex structure, inconvenience of different speeds generated in front and rear wheels, or unnatural driving of his or her arms.

Moreover, the arms and the pedals rotated by the legs are moving in communication with each other. Because of that, a pedal shaft of the handle might be rotated disadvantageously even when the pedals are driven by the legs.

Also, when the rider rotates a handle to drive the bicycle using the strength of his or her arms, a steering shaft of the front wheel might fail to be steered because of the influence of the handle rotation.

As a result, there have been increasing demands for development of a bicycle that can be manufactured by transforming a conventional bicycle easily, that can be driven only by the strength of the rider's arms or legs or only by the strength of both of the rider's arms and legs, that enables the rider's arms and legs to move naturally in a biomechanical aspect, with increasing the driving speed as well as the exercise effects and with giving fun to the rider simultaneously.

Furthermore, there have been increasing demands for a power transmission structure that can prevent a steering shaft from being affected by the rotation of the handle performed to drive a bicycle using the strength of the rider's arms.

SUMMARY

To solve the problems, an object of the present invention is to provide a combined-drive bicycle that is able to increase the driving speed and the beneficial effects of exercise and to enable a rider to feel fun simultaneously.

To achieve the object, the present invention may provide a combined-drive bicycle including a handle assembly configured to steer a front wheel, the handle assembly comprising a crank handle to generate a handle motive force and a first gear rotated by the rotation of the crank handle; a pedal assembly configured to transmit the handle motive force and a pedal motive force generated by pedals to a rear wheel selectively or simultaneously; and a motive force transmission part to transmit the handle motive force to the pedal assembly, irrelevant to the steering of the handle assembly.

Here, the motive force transmission part may include a second gear movable along right and left directions of a handle stem provided in the handle assembly, in a state of being coupled to the first gear; a first power transmission member rotatable, with a variable length based on the movement of the second gear; and a lower shaft configured to transmit the rotational force of the first power transmission member to the pedal assembly.

The motive force transmission part may further include an intermediate connection member connected to the first power transmission member; and a second power transmission member having an end connected to the intermediate connection member and the other opposite end connected to the lower rotation shaft.

In addition, the first power transmission member may include a first universal joint coupled to the second gear; an inner spline coupled to the first universal joint; an outer spline sliding-rotated with the inner spline; and a second universal joint having an end coupled to the outer spline and the other opposite end coupled to an end of the intermediate connection member.

The second power transmission member may include a third universal joint coupled to the other opposite end of the intermediate connection member; a joint middle shaft coupled to the third universal joint; and a fourth universal joint having an end coupled to the joint middle shaft and the other opposite end coupled to the lower rotation shaft.

Also, at least one guide projection may be formed along an outer circumferential surface of the inner spline and at least one projection accommodating recess to engaging with the at least one guide projection may be formed along an inner circumferential surface of the outer spline, to enable the inner spline and the outer spline to be rotated together, with sliding-moving linearly together.

The combined-drive bicycle may further include a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

Also, the combined-drive bicycle may further include a steering frame comprising the steering shaft provided therein; an upper frame having a predetermined side extended from the steering frame and the other opposite side coupled to a main frame; and a lower frame provided under the upper frame, having a predetermined side extended from the steering frame and the other opposite side connected to the pedal assembly, the lower frame comprising the lower rotation shaft provided therein.

The intermediate connection member may include a connection member guide passing through the upper frame to prevent the intermediate connection member from shaking.

The motive force transmission part may be a flexible shaft and an end of the motive force transmission part may be connected to the second gear rotated in a state of gear-joining with the first gear and the other opposite end of the motive force transmission part is connected to the pedal assembly.

The pedal assembly may include a pedal part crank-rotated to rotate the pedal shaft; a pedal hub comprising a third gear coupled to the motive force transmission part to be rotated by the handle motive force, an independent shaft independently rotated from the pedal shaft, and a fourth gear provided in the independent shaft, with being coupled to the third gear to be rotated together with the fourth gear; and a sprocket unit configured to selectively or simultaneously transmit the handle motive force and the pedal motive force transmitted from the pedal part and the pedal hub, respectively, with being rotated to transmit a rotational force to the rear wheel.

The sprocket unit may include a sprocket chain-joint to the rear wheel to transmit a power to the rear wheel; a first one-way clutch provided in the pedal part, with being joint to a predetermined side of the sprocket, to provide the pedal motive force to the sprocket along a predetermined direction; and a second one-way clutch provided in the independent shaft, with being joint to the other opposite side of the sprocket, to be rotated in communication fourth gear, the second one-way clutch rotated independently from the first one-way clutch to provide the handle motive force to the sprocket along a predetermined direction.

The first gear, the second gear, the third gear and the fourth gear may be bevel gears. The rotation rate of the first gear to the second gear to the third gear to the fourth gear may be 1:1:1:1.

The handle assembly may include a handle stem having a concentric main shaft; a crank handle provided in each end of the handle stem, with being crank-rotated to rotate the main shaft; and a handle hub provided in a center of the main shaft, with being rotated in communication with the crank rotation of the crank handle, to transmit a handle motive force to the motive force transmission part.

The present invention may have following advantageous effects.

First of all, the handle hub and the pedal hub may be connected by the motive force transmission part. Because of that, the handle motive force generated by the rotation of the crank handle may be transmitted to the independent shaft driven independently from the pedal shaft.

Second, the handle motive force may be transmitted to the pedal assembly, independent from the steering operation of the handle assembly. Because of that, even when the crank handle is rotated to generate the handle motive force, the rotational force may not affect the steering of the handle assembly.

Third, the first one-way clutch and the second one-way clutch coupled to the pedal shaft and the independent shaft, respectively, to be rotated in communication with each other may be provided in both ends of the sprocket. Because of that, the handle motive force and the pedal motive force may be selectively or simultaneously transmitted to the sprocket.

Fourth, the rotation rate of the first gear of the handle hub to the second gear of the motive force transmission part to the third gear of the pedal hub to the fourth gear of the pedal hub may be 1:1:1:1. When the crank handle performs a single rotation, the sprocket may perform a single rotation precisely. Because of that, the rider may move his or her arms and legs freely to enable the rotation rate of the crank handle to the pedal part to be 1:1, and also the rider may perform intuitive exercise to apply the handle motive force and the pedal motive force to the sprocket simultaneously.

DETAILED DESCRIPTION

There will be described in detail exemplary embodiments which can embody the technical object, in reference to the accompanying drawings.

Figure 1:
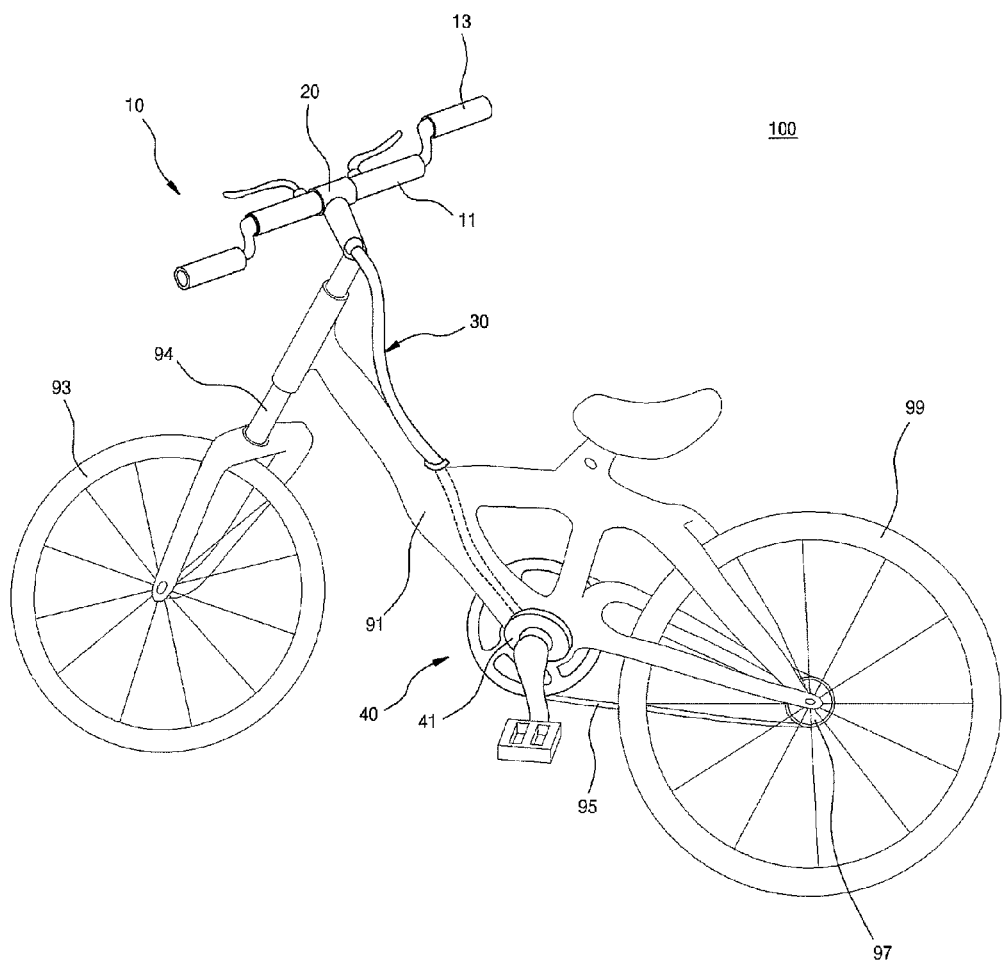
FIG. 1 is a diagram illustrating a combined-drive bicycle according to a first embodiment of the present invention.
Figure 2:
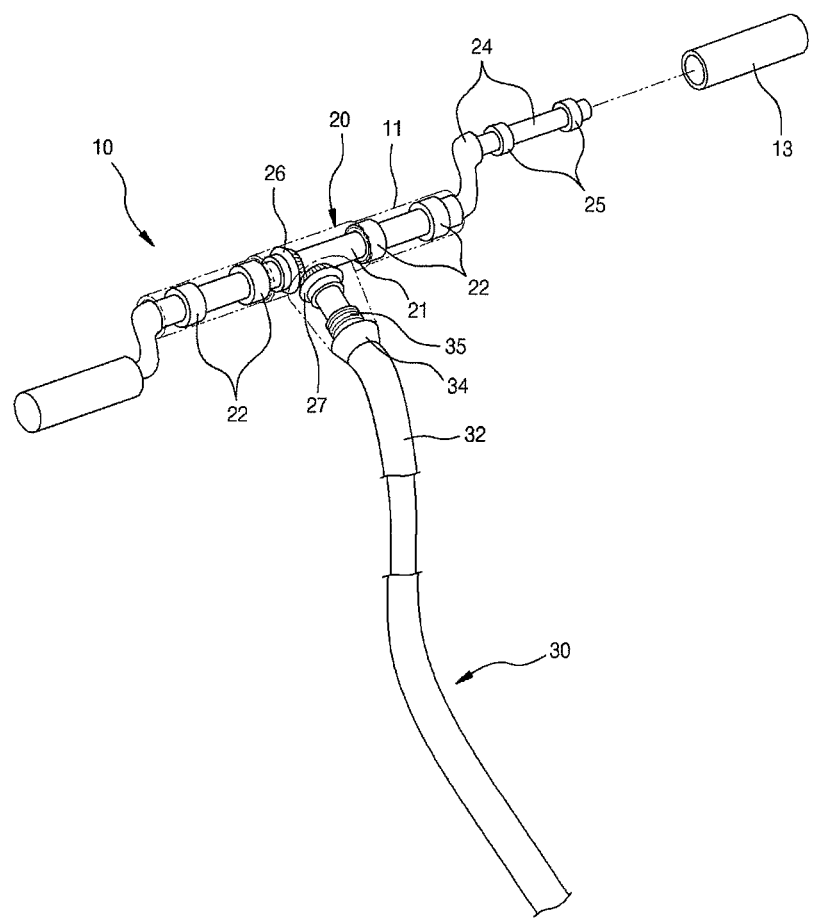
FIG. 2 is a block diagram illustrating a handle assembly and a motive force transmission part provided in the combined-drive bicycle according to the first embodiment of the present invention.
Figure 3:
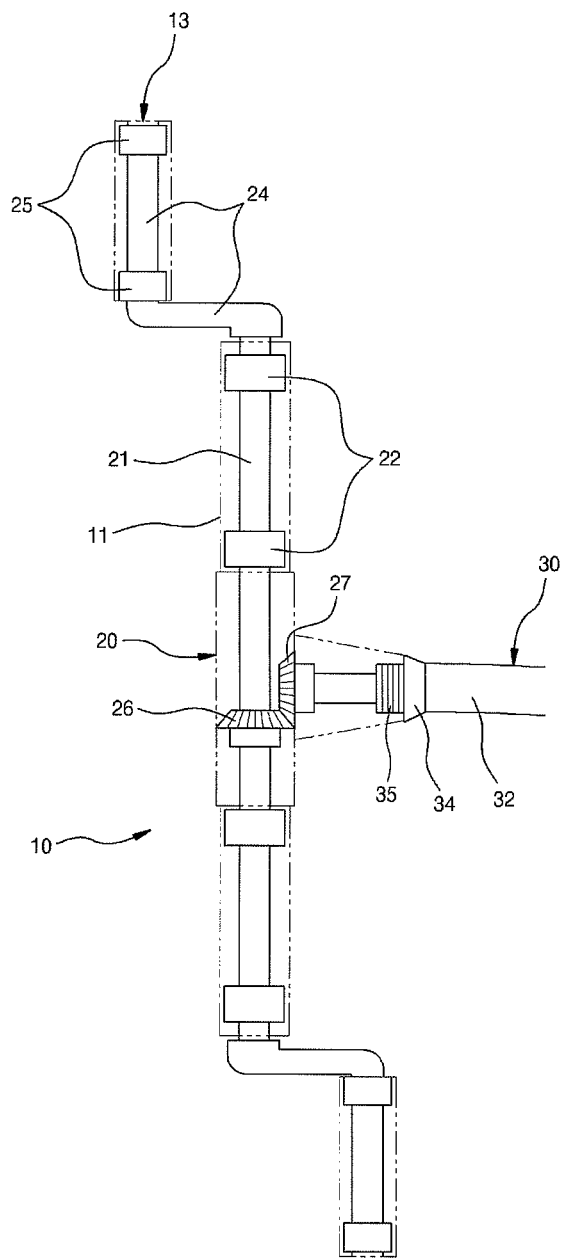
FIG. 3 is a plane view illustrating a coupling state between the handle assembly and the motive force transmission part provided in the combined-drive bicycle according to the first embodiment of the present invention.

FIG. 1 is a diagram illustrating a combined-drive bicycle according to a first embodiment of the present invention. FIG. 2 is a block diagram illustrating a handle assembly and a motive force transmission part provided in the combined-drive bicycle according to the first embodiment of the present invention. FIG. 3 is a plane view illustrating a coupling state between the handle assembly and the motive force transmission part provided in the combined-drive bicycle according to the first embodiment of the present invention.

As shown in FIGS. 1 to 3, the combined-drive bicycle 100 may include a handle assembly 10, a pedal assembly 40 and a motive force transmission part 30. Here, the handle assembly 10 may steer a front wheel 93 and generate a handle motive force as a crank handle 13 is crank-rotated. The generated handle motive force may be transmitted to the motive force transmission part 30 via a handle hub 20 and re-transmitted to the pedal assembly 40. Here, the pedal assembly 40 may include a pedal part 42 crank-rotated to generate a pedal motive force. The pedal motive force and the handle motive force may be transmitted to a rear wheel 99 selectively or simultaneously. Through this process, the combined-drive bicycle 100 may be driven only by the strength of a rider's arms or legs or by both of the strength of the arms and the strength of the legs.

In detail, the handle assembly 10 may be coupled to a top end of a steering shaft 94 and a front wheel 93 may be coupled to the steering shaft 94. Because of that, the rider may change the direction of the front wheel 93 by operating the handle assembly 10 and steer the combined-drive bicycle 100 accordingly.

Here, the handle assembly 10 may include a handle stem 11, a crank handle 13 and a handle hub 20.

First of all, a pair of bearings 22 may be provided at each end of a main shaft 21 having a concentric circle.

The handle stem 11 may be coupled to the pair of the bearings coveringly.

As a result, the main shaft 21 may be rotatable freely even when the rider grasps the handle stems 11 with the hands.

The crank shaft 24 may be provided at each end of the main shaft 21.

Also, a pair of bearings 25 may be provided in the crank shaft 24 and the crank handle 13 may be coupled to the pair of the bearings 25 coveringly.

As a result, when the rider pivots the crank handle 13 on a center axis of the handle stem 11 with the hands, the crank shaft 24 may be crank-rotated and the main shaft 21 connected to the crank shaft 24 may be rotated in communication with the crank-rotation of the crank shaft 24.

In the meanwhile, the handle hub 20 may be provided in a center portion of the main shaft 21.

Here, the handle hub 20 may include a first gear 26 and a second gear 27. The handle hub 20 may be connected to the top end of the steering shaft 94.

The first gear 26 may be provided in the main shaft 21 and it may be rotated together with the main shaft 21.

Also, the second gear 27 may be gear-jointed to the first gear 26.

At this time, the first gear 26 and the second gear 27 may be bevel gears. A rotational direction of the first gear 26 may be changed by the second gear 27.

The rotation rate of the first gear 26 to the second gear 27 may be 1:1. For that, the first gear 26 and the second gear 27 may be miter gears.

In the meanwhile, the motive force transmission part 30 may be provided in a body frame 91 of the combined-drive bicycle 100.

An end of the motive force transmission part 30 may be insertedly connected to the handle hub 20 to be connected to the second gear 27.

Because of that, as the second gear 27 is rotated, the motive force transmission part 30 may be rotated in communication with the rotation of the second gear 27. The rotational force of the second gear 27 may be transmitted via the motive force transmission part 30.

Here, the motive force transmission part 30 may be flexible shaft.

The flexible shaft may be protected by a cover 32 provided in the outside thereof and a connecting part 34 may be provided at an end of the cover 32.

Also, the connecting part 34 may be fixed to the handle hub 20. For example, screw threads 35 may be formed in a predetermined portion of an outer surface of the connecting part 34 and a predetermined portion of an inner surface of the handle hub 20, respectively, to enable screw-coupling.

Because of that, the handle assembly 10 may be rotated on the steering shaft 94 smoothly, in a state of the motive force transmission part 30 being fixed to the handle hub 20 securely.

In the meanwhile, the other end of the motive force transmission part 30 may be coupled to the pedal assembly 40.

The handle motive force generated as the crank handle 13 is rotated may be transmitted to the pedal assembly 40 via the main shaft 21, the first gear 26, the second gear 27 and the motive force transmission part 30 sequentially.

Figure 4:
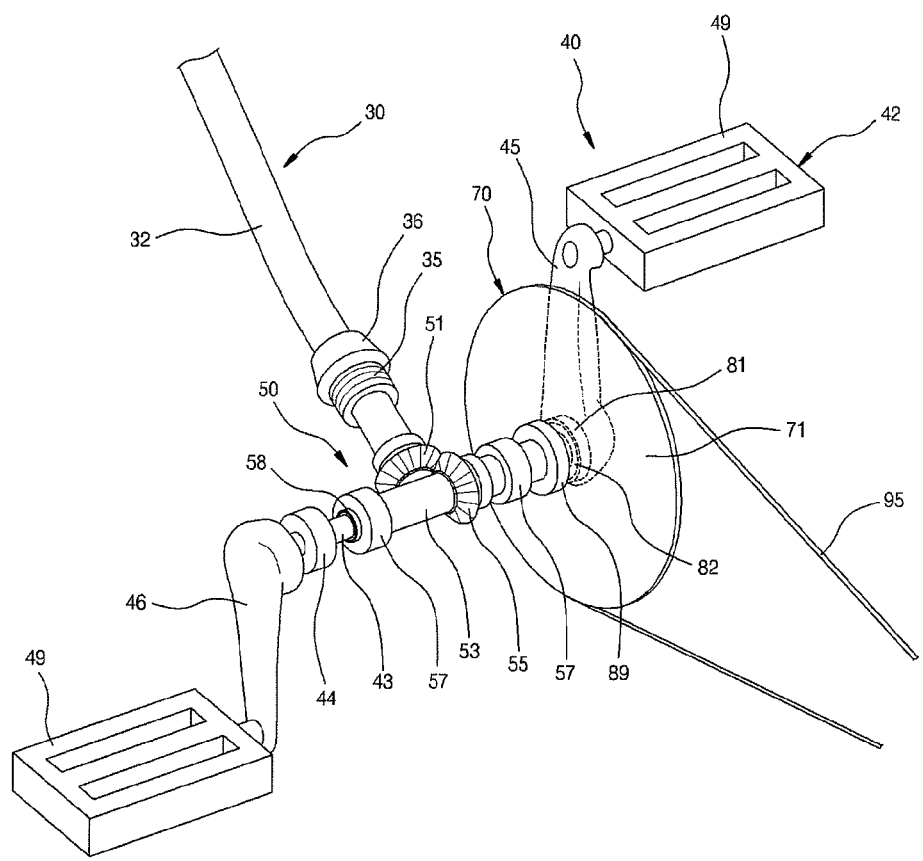
FIG. 4 is a block diagram illustrating a pedal assembly and the motive force transmission part provided in the combined-drive bicycle according to the first embodiment of the present invention.
Figure 5:
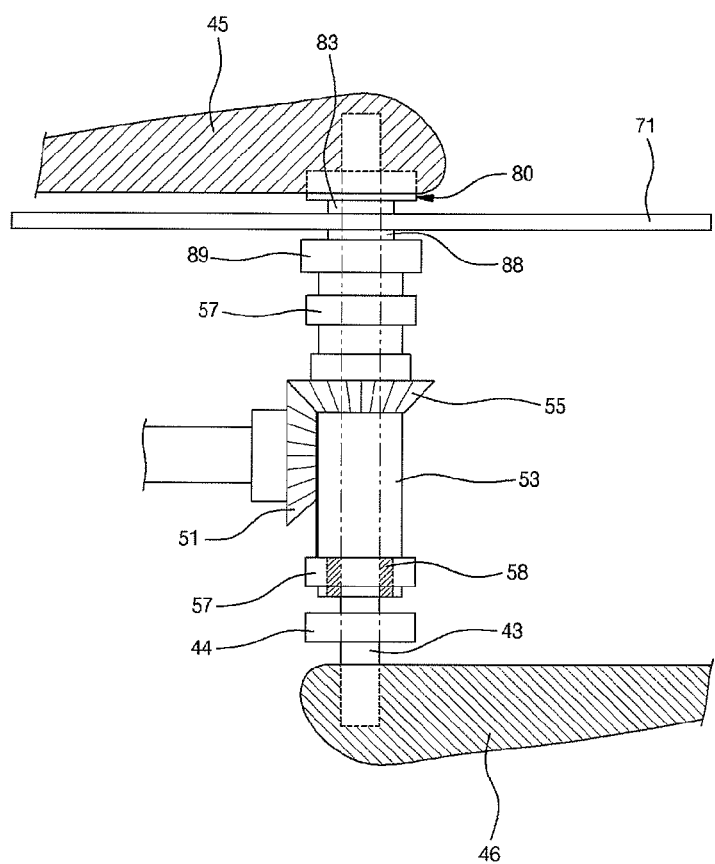
FIG. 5 is a plane view illustrating a coupling state between the pedal assembly and the motive force transmission part provided in the combined-drive bicycle according to the first embodiment of the present invention.
Figure 6:
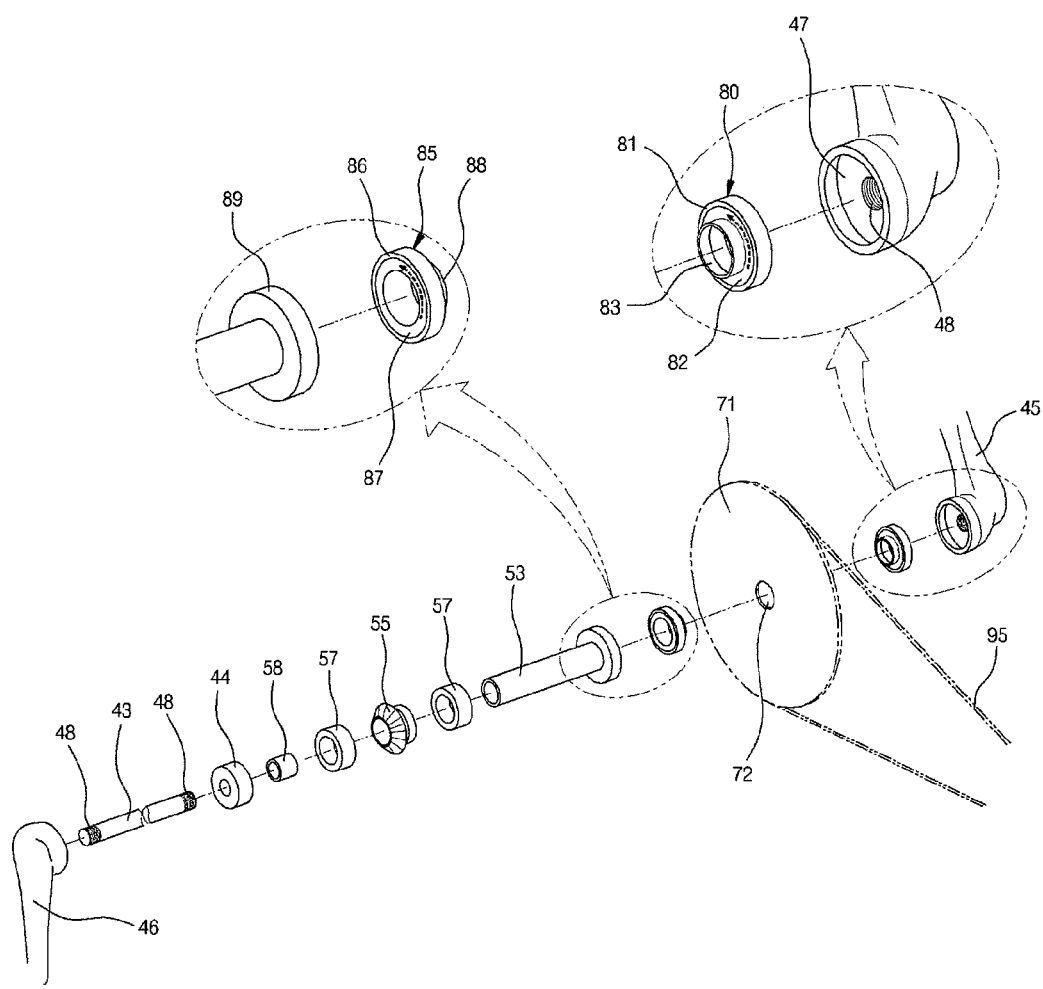
FIG. 6 is an exploded perspective view illustrating the pedal assembly of the combined-drive bicycle according to the first embodiment of the present invention.
Figure 7:
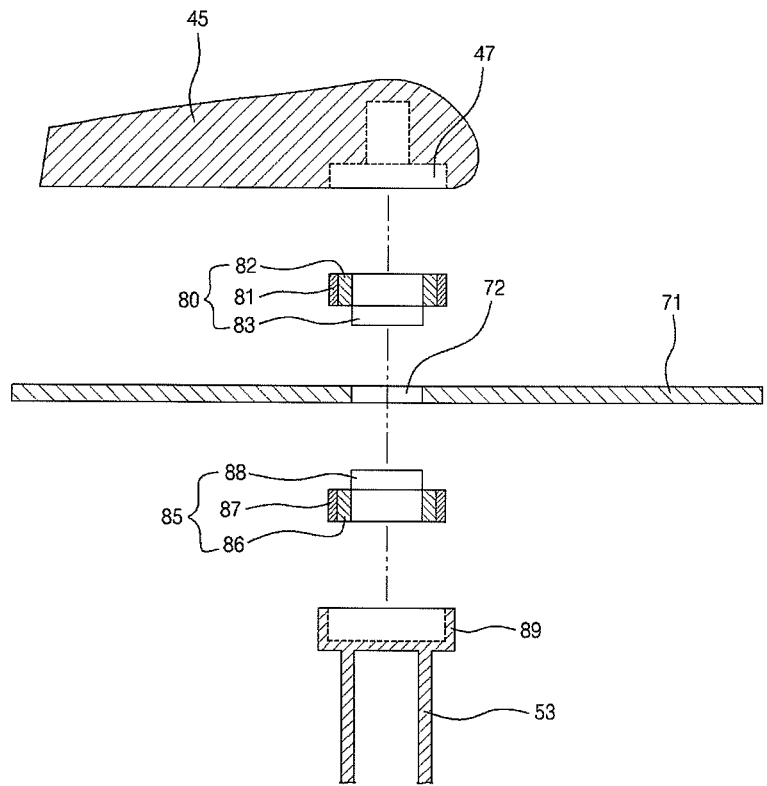
FIG. 7 is a plane assembly view illustrating a sprocket unit provided in the combined-drive bicycle according to the first embodiment of the present invention.

FIG. 4 is a block diagram illustrating a pedal assembly and the motive force transmission part provided in the combined-drive bicycle according to the first embodiment of the present invention. FIG. 5 is a plane view illustrating a coupling state between the pedal assembly and the motive force transmission part provided in the combined-drive bicycle according to the first embodiment of the present invention. FIG. 6 is an exploded perspective view illustrating the pedal assembly of the combined-drive bicycle according to the first embodiment of the present invention. FIG. 7 is a plane assembly view illustrating a sprocket unit provided in the combined-drive bicycle according to the first embodiment of the present invention.

As shown in FIGS. 4 to 7, the pedal assembly 40 may include the pedal part 42, the pedal hub 50 and the sprocket unit 70.

Here, the pedal part 42 may include a pedal shaft 43, a first rod 45, a second rod 46 and pedals 49.

The pedal shaft 43 may be provided through a center of a pedal housing (41, see FIG. 1), more specifically, through the pedal hub 50.

The pedal shaft 43 may be supported by a bearing 44 in the pedal housing 41.

The first rod 45 and the second rod 46 may be provided at both ends of the pedal shaft 43, respectively, and the pedals 49 may be coupled to the rods 45 and 46, respectively.

A screw tread 48 may be formed at each end of the pedal shaft 43 and each of the first and second rods 45 and 46, to enable the pedal shaft 43 to be screw-coupled to the rods.

As a result, when the rider rotates the pedals 49 by the feet, the pedal shaft 43 may be rotated.

The pedal hub 50 may be provided to an outer surface of the pedal shaft 43. The pedal hub 50 may include a third gear 51, an independent shaft 53 and a fourth gear 55.

Here, the third gear 51 may be provided at the other end of the motive force transmission part 30 and it may be rotated together with the motive force transmission part 30.

The connecting part 36 may be provided at the other end of the motive force transmission part 30 and a screw thread 35 may be formed at the connecting part 36 to be coupled to the pedal housing 41.

The independent shaft 53 may be coveringly provided in an outside of the pedal shaft 43 and it may be rotated, independent from the pedal shaft 43.

For that, an inner diameter of the independent shaft 53 may be larger than an outer diameter of the pedal shaft 43.

The fourth gear 55 may be coupled to the outside of the independent shaft 53.

Here, the third gear 51 and the fourth gear 55 may be bevel gears and the rotational direction of the third gear 51 may be changed by the fourth gear 55 accordingly.

Also, the rotation rate of the third gear 51 to the fourth gear 55 may be 1:1 and the rotation rate may be identical to the rotation rate of the first gear 26 to the second gear 27.

In other words, the rotation rate of the first gear 26 to the second gear 27 to the third gear 51 to the fourth gear 55 may be 1:1:1:1.

A bearing 57 may be provided at the outer surface of the independent shaft 53 to enable the independent shaft 53 to be rotated and supported in the pedal housing 41.

Also, a bearing 58 may be further provided between the independent shaft 53 and the pedal shaft 43, to enable the pedal shaft 43 to be rotated within the independent shaft 53 smoothly.

At this time, the number and the installation positions of the bearings provided between the pedal shaft 43 and the independent shaft 53 and the independent shaft 53, at the outer surface of the pedal shaft 43 and at the outer surface of the independent shaft may be adjustable properly, not limited thereto.

Because of that, the independent shaft 53 and the pedal shaft 43 may be rotated and stopped by the handle motive force, independent from the rotation of them.

In the meanwhile, the sprocket unit 70 may include a sprocket 71, a first one-way clutch 80 and a second one-way clutch 85.

The pedal shaft 43 may be provided though a through-hole 72 formed in a center of the sprocket 71.

At this time, an inner surface of the through-hole 72 may be coupled to an outer surface of the pedal shaft 43. A bearing (not shown) may be further provided, with an outer surface coupled to the through-hole 72, to connectedly support the pedal shaft 43 and the sprocket 71.

A chain 95 may be coupled to an outer circumferential surface of the sprocket 71 and the chain 95 may be coupled to a driven sprocket (97, see FIG. 1) provided in the rear wheel (99, see FIG. 1) to transmit the rotational force of the sprocket 71 to the rear wheel 99.

In the meanwhile, the first one-way clutch 80 may be provided on a lateral surface of the sprocket 71 and the second one-way clutch 85 may be provided on the other lateral surface of the sprocket 71.

Here, the first one-way clutch 80 may include a first external wheel 81 and a first internal wheel 82.

The first external wheel 81 may be fixedly coupled to a first coupling part 47 formed in the first rod 45.

The first internal wheel 82 may be coupled to the inside of the first external wheel 81 and it may be rotated in communication as the first external wheel 81 is rotated.

Especially, an inner link (not shown) may be coupled to the first internal wheel 82 and the first internal wheel 82 may be rotated together with the first external wheel 81, only when the first external wheel 81 is rotated along a predetermined direction (a direction to rotate the rear wheel to move the combined-drive bicycle 100 forwardly).

Also, when the first internal wheel 82 is rotated by another rotational force not by the first external wheel 81, the inner link may be unlocked and the first external wheel 81 may be slidingly rotated together with the first internal wheel 82.

A first flange 83 may be formed in a lateral surface of the first internal wheel 82 and the first flange 83 may be coupled to a lateral surface of the sprocket 71.

Because of that, the pedal force generated as the first rod 45 is rotated along the predetermined direction may be transmitted to the first external wheel 81 coupled to the first rod 45.

After that, the first external wheel 81 may be rotated in communication with the first rod 45.

As the first external wheel 81 and the first internal wheel 82 connected to the inner link are rotated, the first flange 83 may be rotated and the sprocket 71 may be rotated accordingly.

As a result, as the sprocket 71 is rotated, the driven sprocket 97 connected to the sprocket by the chain 95 may be rotated and the rear wheel 99 may be rotated. As a result, the combined-drive bicycle 100 may be driven by the pedal motive force.

An auxiliary bearing (not shown) may be further provided between the first internal wheel 82 and the pedal shaft 43.

In the meanwhile, the second one-way clutch 85 may include a second external wheel 86 and a second internal wheel 87.

Here, the operation of the second one-way clutch 85 may be the same as that of the first one-way clutch 80 described above.

In other words, an inner link (not shown) may be coupled to the second internal wheel 87 and the second internal wheel 87 may be rotated together with the second external wheel 86, only when the second external wheel 86 is rotated along a predetermined direction (a direction to rotate the rear wheel to move the combined-drive bicycle 100 forwardly).

When the second internal wheel 87 is rotated by another rotational force not by the second external wheel 86, the inner link may be unlocked and the second external wheel 86 may be slidingly rotated together with the second internal wheel 87.

A second flange 88 may be formed in the other lateral surface of the second internal wheel 87 and the second flange 88 may be coupled to the other lateral surface of the sprocket 71.

The second external wheel 86 may be fixedly coupled to a second coupling part 89 formed in an end of the independent shaft 53.

As a result, when the handle motive force transmitted by the third gear 51 and the fourth gear 55 may rotate the independent shaft 53, the second external wheel 86 may be rotated and the second internal wheel 87 may be rotated in communication with the rotation of the second external wheel 86.

As the second internal wheel 87 is rotated, the sprocket connected with the second flange 88 may be rotated and the sprocket 71 may be rotated by the handle motive force accordingly.

However, the independent shaft 53 and the pedal shaft 43 may be independently rotated. Also, the first one-way clutch 80 and the second one-way clutch 85 may be rotated independently. Because of that, the handle motive force and the pedal motive force may be transmitted to the sprocket 71 selectively or simultaneously.

In other words, when the rotation speed of the first one-way clutch 80 generated by the pedal motive force is higher than the rotation speed of the second one-way clutch 85 generated by the handle motive force, the sprocket 71 may be rotated by the first one-way clutch 80.

At this time, the second internal wheel 87 and the second external wheel 86 of the second one-way clutch 85 may be slidingly rotated.

In contrast, when the rotation speed of the first one-way clutch 80 generated by the pedal motive force is lower than the rotation speed of the second one-way clutch 85 generated by the handle motive force, the sprocket 71 may be rotated by the second one-way clutch 85 and the first internal wheel 82 and the first external wheel 81 of the first one-way clutch 80 may be slingly rotated.

When the rotation speed of the first one-way clutch 80 generated by the pedal motive force is identical to the rotation speed of the second one-way clutch generated by the handle motive force to be 1:1, the sprocket 71 may be rotated by both of the pedal motive force an the handle motive force, in other words, by the first one-way clutch 80 and the second one-way clutch 85.

As a result, the combined-drive bicycle 100 may be increased and the beneficial effects of the rider's hand excise as well as the rider's feet exercise may be provided, only to enhance the effect of exercise.

In detail, the rotation rate of the first gear 26 to the second gear 27 to the third gear 51 to the fourth gear may be 1:1:1:1. When the sprocket is rotated by the handle motive force, the first rotation of the crank handle (13, see FIG. 1) may generate the first rotation of the sprocket 71.

In this case, when the rider rotates the pedal part 42 to the same rotation speed as the rotation speed of the crank handle 13, the handle motive force and the pedal motive force may be applied to the sprocket simultaneously.

That is, the rider may enable the rotation movement of the arms to be the same as the rotation movement of the legs intuitively and then he or she may rotate the sprocket 71, using the handle motive force and the pedal motive force smoothly.

The natural swing of the arms and legs in an aspect of the biomechanical aspect (for example, the swing of the arms and legs in walking or running) may rotate the crank handle 13 and the pedal part 42. Because of that, more natural movement of the arms and legs may be realized.

In the meanwhile, when the rotation speed of the first one-way clutch 80 generated by the pedal motive force is higher than the rotation speed of the second one-way clutch 85 generated by the handle motive force, the second internal wheel 87 and the second external wheel 86 provided in the second one-way clutch 85 may be relatively sliding-rotated.

As a result, the rider may rotate the crank handle (13, see FIG. 1), using the small power, at a lower rotation speed than the rotation speed of the pedal shaft 43 and he or she may rotate it along a reverse direction.

Because of that, the rider may intuitively select the position of the crank handle that he or she applies the power to, when rotating the crank handle.

Figure 8:
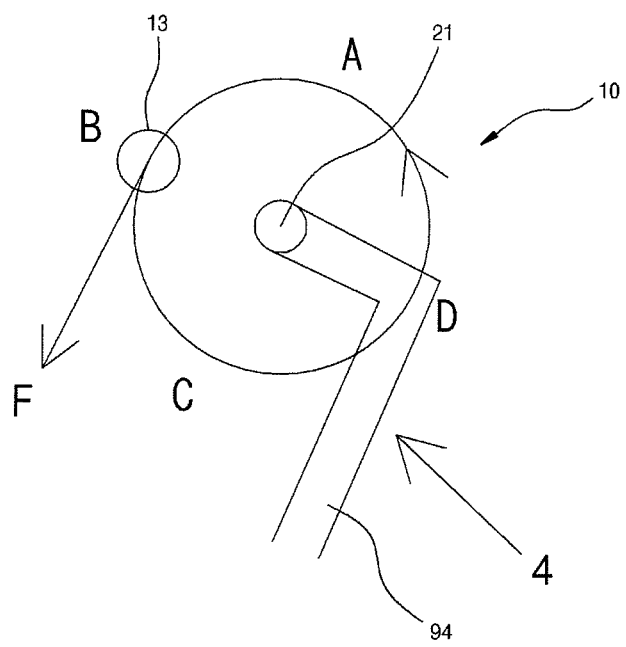
FIG. 8 is a diagram illustrating an example of operation of the handle assembly provided in the combined-drive bicycle according to the first embodiment of the present invention.

FIG. 8 is a diagram illustrating an example of the operation of the handle assembly provided in the combined-drive bicycle according to the first embodiment. As shown in FIG. 8, when applying the power at a position of 'A' or 'C' in rotating the crank handle 13, the power may generate moment with respect to the steering shaft 94 and the handle assembly 10 may be rotated.

However, the rider may apply the power at a position of 'B' not at 'A' or 'C' and the direction (F) of the power may be horizontal with the steering shaft 94 and unstable handle rotation moment might be generated accordingly.

This is the same concept of stepping the pedals. For example, one of the pedals is stepped and then the pedal shaft is rotated by the inertia. After that, the opposite pedal is stepped.

In other words, the crank handle 13 is pressed by one of the rider's hands at the position of 'B'. After the main shaft 21 is rotated by the rotational inertia, the other crank handle 13 is pressed by the other hand at the position 'B'. That operation may be performed in the crank handle naturally like in the pedals.

As a result, even when the crank handle 13 is driven, the rider's posture may be controllable without shaking the handle assembly 10.

Whenever needing posture control, the rider may stop the crank handle any time and control the posture. When driving the crank handle 13 and the pedal part (42, see FIG. 4), the rider may adjust the movement of the arms and legs and select the relative position of the left and right hands and the right and left feet intuitively.

The most natural driving in the biomechanical aspect when moving the right and left hands and feet may be that the right hand-left foot and the left hand-right foot are continuously performed with respect to a first rotation of the driving shaft such as the main shaft 21 and the pedal shaft (43, see FIG. 4). Since the sprocket unit (70, see FIG. 4) has the driving mechanism mentioned above, the rider may naturally use all of the strength of the arms and legs in the driving and the rider may freely perform the posture control such as driving only using the arms with resting the legs or only using the legs with resting the arms.

Figure 9:
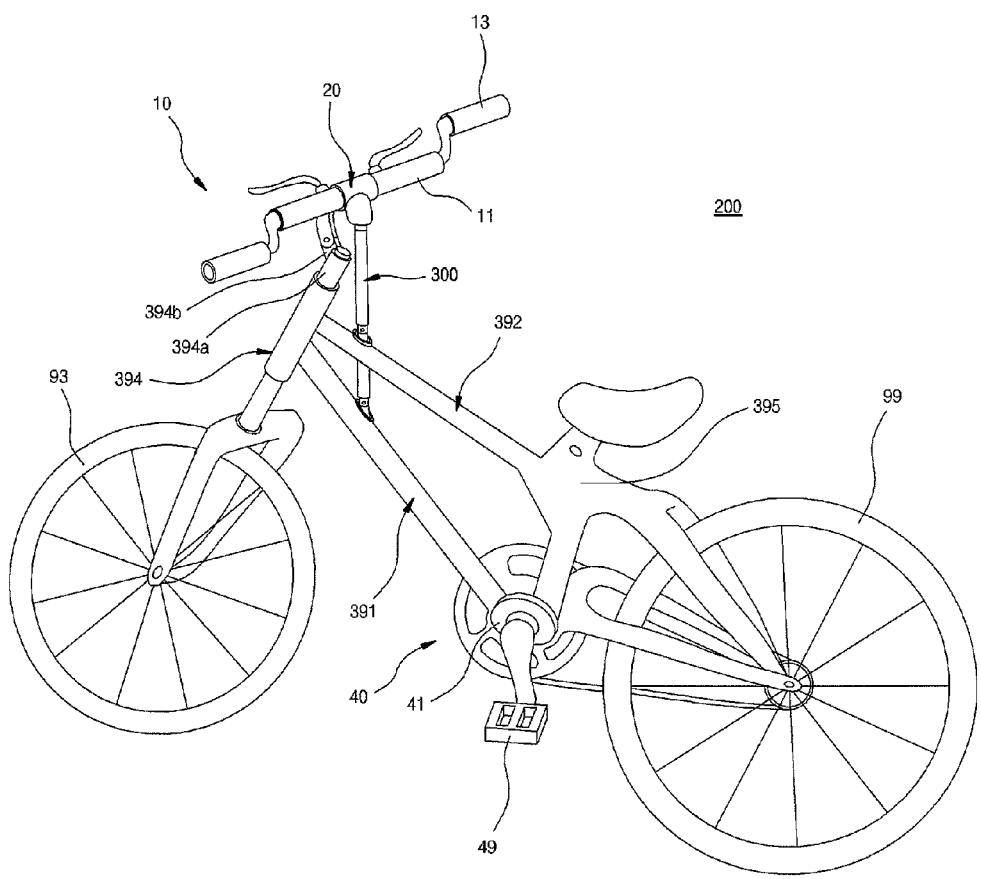
FIG. 9 is a diagram illustrating a combined-drive bicycle according to a second embodiment of the present invention.
Figure 10:
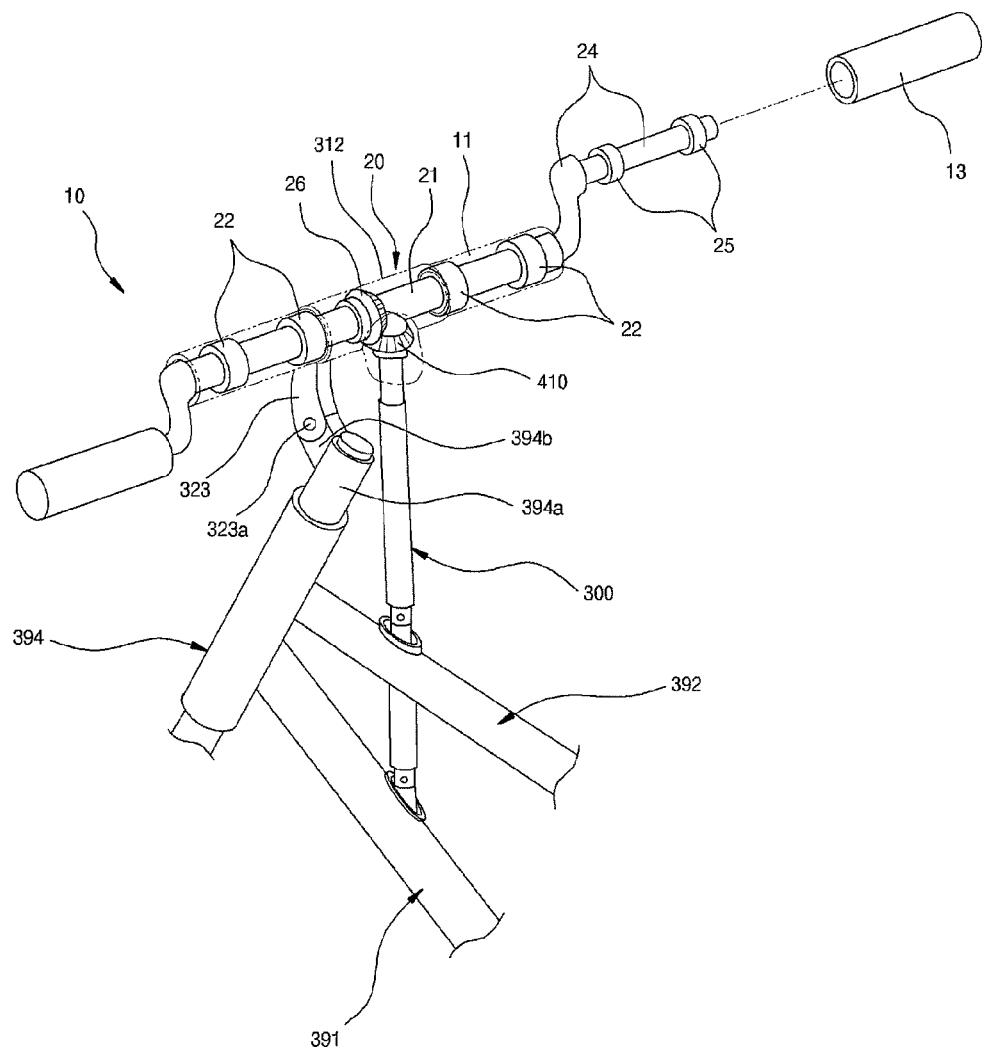
FIG. 10 is a block diagram illustrating a handle assembly and a motive force transmission part provided in the combined-drive bicycle according to the second embodiment of the present invention.
Figure 11:
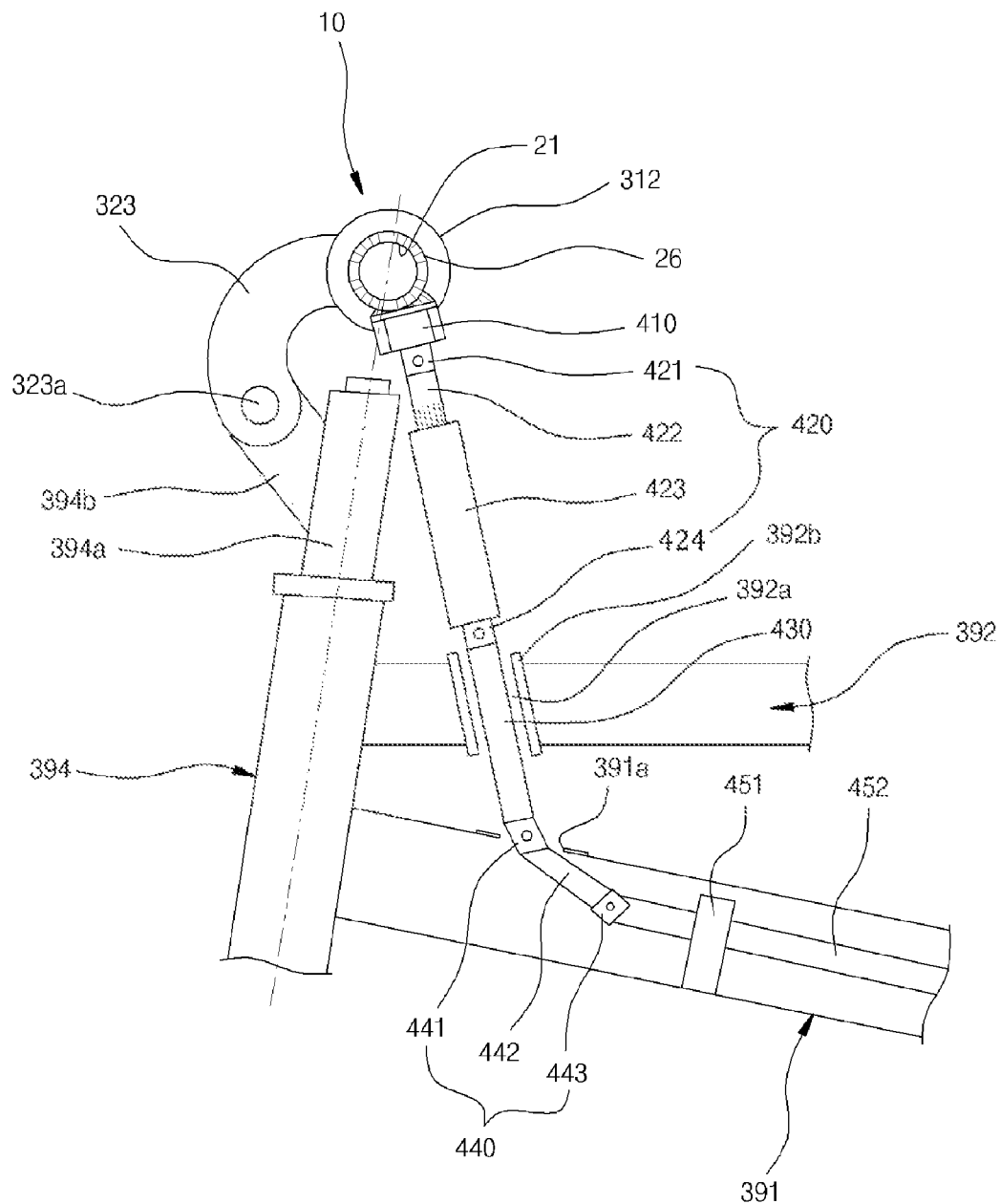
FIG. 11 is a sectional view illustrating a coupling state between the handle assembly and the power transmission provided in the combined-drive bicycle according to the second embodiment of the present invention.
Figure 12:
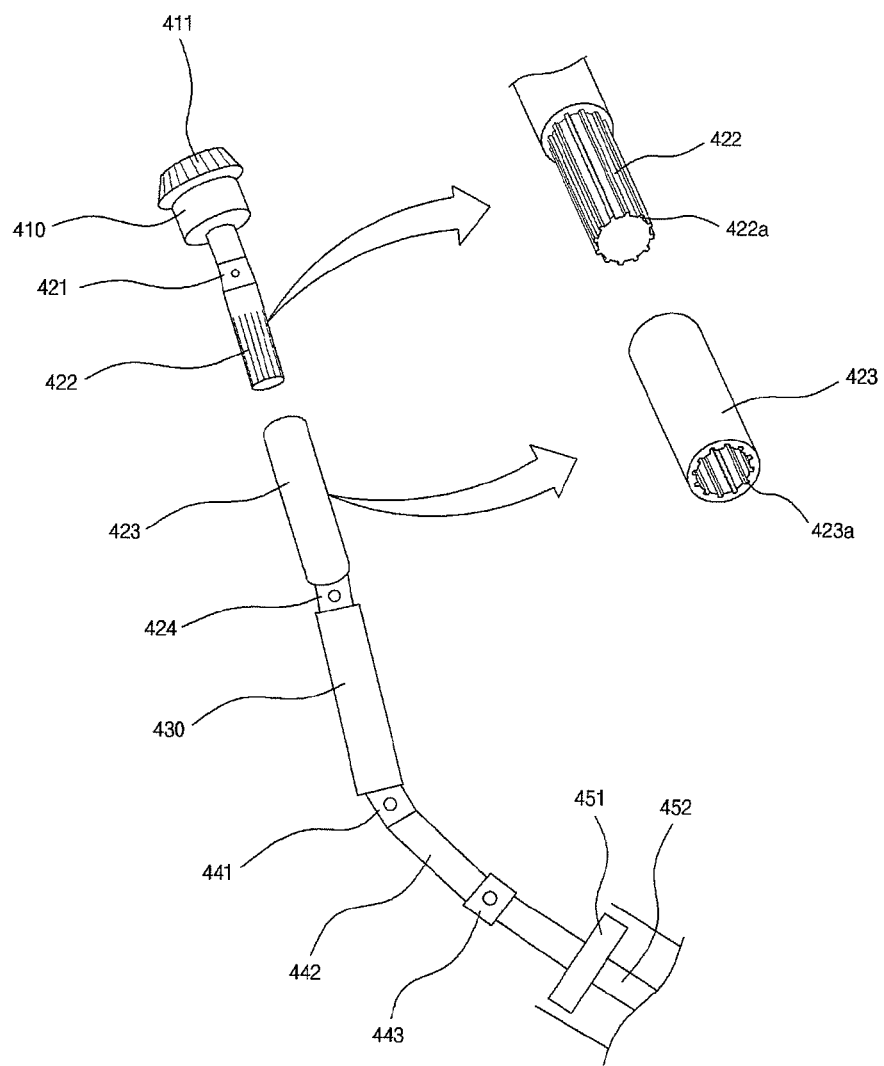
FIG. 12 is a block diagram illustrating the motive force transmission part of the combined-drive bicycle according to the second embodiment of the present invention.
Figure 13:
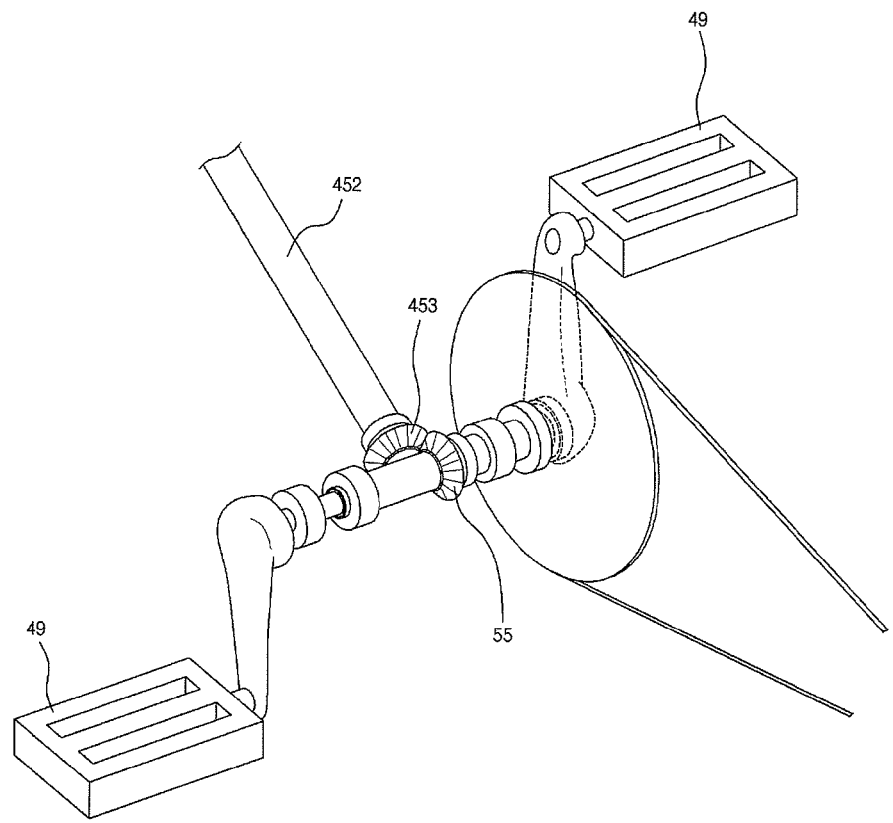
FIG. 13 is a block diagram illustrating a coupling state between a lower shaft of the motive force transmission part and the pedal assembly provided in the combined-drive bicycle according to the second embodiment of the present invention.

FIG. 9 is a diagram illustrating a combined-drive bicycle according to a second embodiment. FIG. 10 is a block diagram illustrating a handle assembly and a motive force transmission part provided in the combined-drive bicycle according to the second embodiment. FIG. 11 is a sectional view illustrating a coupling state between the handle assembly and the power transmission provided in the combined-drive bicycle according to the second embodiment. FIG. 12 is a block diagram illustrating the motive force transmission part of the combined-drive bicycle according to the second embodiment. FIG. 13 is a block diagram illustrating a coupling state between a lower shaft of the motive force transmission part and the pedal assembly provided in the combined-drive bicycle according to the second embodiment. Configurations of a handle assembly and a pedal assembly according to this embodiment may be the same as the configurations of the handle assembly and the pedal assembly, and detailed description of the configurations will be omitted.

As shown in FIGS. 9 to 13, the combined-drive bicycle 200 may include a handle assembly, a pedal assembly 40 and a motive force transmission part 300.

Here, the handle assembly 10 may generate a handle motive force and steer the front wheel 93 simultaneously.

The pedal assembly 40 may selectively or simultaneously transmit the handle motive force and the pedal motive force generated by the pedals 49 to the rear wheel 99.

Also, the motive force transmission part 300 may transmit the handle motive force to the pedal assembly 40, irrelevant to the steering operation of the handle assembly 10.

The combined-drive bicycle 200 may include a steering frame 394, an upper frame 392 and a lower frame 391.

Here, the steering frame 394 may have a steering shaft 394a.

A predetermined side of the upper frame 392 may be extended from the steering frame 394 and the other opposite side thereof may be coupled to a body frame 395.

The lower frame 391 may be located under the upper frame 392. A predetermined side of the lower frame 391 may be extended from the steering frame 394 and the other opposite side thereof may be connected with the pedal assembly 40. A lower rotation shaft 452 may be provided in the lower frame 391.

More specifically, the handle assembly 10 may be coupled to a top of the steering shaft 394a having the front wheel 93 coupled thereto. Because of that, the rider may change the direction of the front wheel 93 by operating the handle assembly 10 and the steering of the combined-drive bicycle may be enabled.

The handle assembly 10 may include the handle stem 11, the crank handle 13 and the handle hub 20.

The handle hub 20 may include a hub housing 312 and a first gear 26 coupled to the main shaft 21, located in the hub housing 312, to be rotated together with the main shaft 21.

A projected connection part 323 may be provided in the hub housing 312 and the projected connection part 323 may be projected forward from the handle assembly 10.

Also, the first gear 26 may be gear-joint with a second gear 410 of the motive force transmission part 300. The first gear 26 and the second gear 410 may be bevel gears.

Through this process, the rotational direction of the first gear 26 may be changed by the second gear 410.

The rotation rate of the first gear 26 to the second gear 410 may be 1; 1 and it is preferable that they may be miter gears.

In the meanwhile, the steering shaft 394a may be installed in the steering frame 394, to steer the front wheel 93, and a steering shaft connection part 394b connected to the projected connection part 323 may be projected from a predetermined portion of the steering shaft 394a.

The projected connection part 323 and the steering shaft connection part 394b may be coupled to each other by a coupling bolt 323a.

Here, before the projected connection part 323 is coupled to the steering shaft connection part 394b by the coupling bolt 323a, a connection angle may be adjusted to locate a center f the handle stem 11 provided in the handle assembly 10 on a line extended from a center line of the steering shaft 394a.

In other words, the projected connection part 323 and the steering shaft connection part 394b may be securely coupled to each other by the coupling bolt 323a at the position in which the center of the handle stem 11 is located on the extended line from the center line of the steering shaft 394a.

In the meanwhile, the motive force transmission part 300 may include a second gear 410, a first power transmission member 420 and a lower rotation shaft 452.

Here, the second gear 410 may be movable, corresponding to a right and left rotation direction of the handle stem 11 provided in the handle assembly 10.

The first power transmission member 420 may be rotated, with a variable length based on the movement of the second gear 410.

The lower rotation shaft 452 may transmit the rotational force of the first power transmission member 420 to the pedal assembly 40.

The second gear 410 may be movable, corresponding to the first gear 26. A second gear head 411 configured to engage with the first gear 26 may be formed in the second gear 410.

Also, the motive force transmission part 300 may further include an intermediate connection member 430 connected to the first power transmission member 420 and a second power transmission member 440 having an end connected to the intermediate connection member 430 and the other end connected to the lower rotation shaft 452.

Here, the first power transmission member 420 and the second transmission member 440 may be cardan-joints Such a cardan joint may have an advantageous structure in transmitting a uniform rotation speed.

More specifically, the first power transmission member 420 may include a first universal join 421, an inner spline 422, an outer spline 423 and a second universal join 424.

The first universal join 421 may be coupled to the second gear 410.

The inner spline 422 may be coupled to the first universal join 421 and the outer spline 423 may be slidingly rotated together with the inner spline 422.

An end of the second universal joint 424 may be coupled to the outer spline 423 and the other end of the second universal joint 423 may be coupled to an end of the intermediate connection member 430.

Here, at least one guide projection 422a may be formed in an outer circumferential surface of the inner spline 422, to guide the inner spline 422 and the outer spline 423 to be rotated together and to sliding-move linearly at the same time.

At least one projection accommodating recess 423a may be formed along an inner circumferential surface of the outer spline 423 to engage with the guide projection 422a.

Also the second power transmission member 440 may include a third universal joint 441, a joint middle shaft 442 and a fourth universal joint 443.

Here, the third universal joint 441 may be coupled to the other end of the intermediate connection member 430 and the joint middle shaft 442 may be coupled to the third universal joint 441.

An end of the fourth universal joint 443 may be coupled to the joint middle shaft 442 and the other end of the fourth universal joint 443 may be coupled to the lower rotation shaft 452.

Also, the intermediate connection member 430 may be installed through the upper frame 392.

A through-hole 392a may be formed in the upper frame 392 to pass the intermediate connection member 430 there through. A connection member guide 392b may be provided along a circumference of the through-hole 392a to prevent the intermediate connection member 430 from shaking.

A lower hole 391a may be formed in the lower frame 391 insert the end of the second power transmission member 440 therein. The lower shaft 452 may be installed in the lower frame 391.

A supporting bearing 451 may be provided in the lower frame 391 to support the lower rotation shaft 452.

Also, the third gear 453 may be provided at an end of the lower rotation shaft 452 connected to the pedal assembly 40, to transmit the rotational force of the lower rotation shaft 452 to the pedal assembly 40.

As a result, when the crank handle 13 is rotated on the main shaft 21, the first gear 26 coupled to the main shaft 21 may be rotated.

When the first gear 26 is rotated, the second gear 410 engaging with the first gear 26 may be rotated together.

When the second gear 410 is rotated, the first power transmission member 420 may be rotated.

After that, when the first power transmission member 420 is rotated, the intermediate connection member 430 may be rotated. When the intermediate connection member 430 is rotated, the lower rotation shaft 452 may be rotated.

Also, when the lower rotation shaft 452 is rotated, the third gear 453 may be rotated and it may be rotated together with the fourth gear 44 engaging therewith, which is provided in the pedal assembly 40. Because of that, the rotational force of the lower rotation shaft 452 may be transmitted to the pedal assembly 40.

Figure 14:
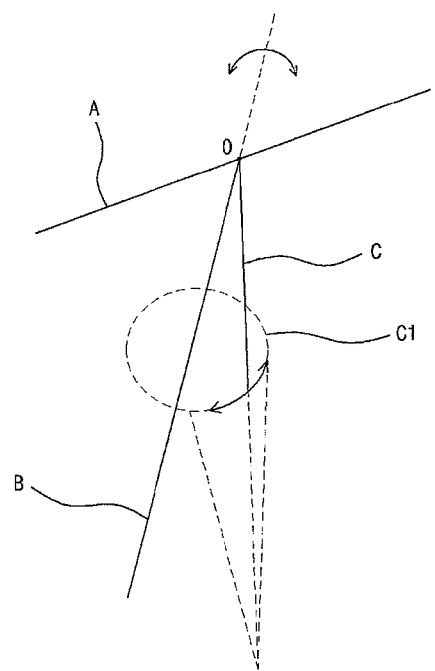
FIG. 14 is a diagram illustrating moving directions of a center axis of a handle stem, a steering shaft and a center axis of a second gear, when the handle assembly of the combined-drive bicycle according to the second embodiment of the present invention.

FIG. 14 is a diagram illustrating moving directions of a center axis of a handle stem, a steering shaft and a center axis of a second gear, when the handle assembly of the combined-drive bicycle according to the second embodiment of the present invention.

In reference to FIGS. 10 to 14, a state of the combined-drive bicycle 200 will be described when it performs the steering operation.

First of all, when the handle assembly 10 performs the steering operation, a center axis (A) of the handle stem 11 may be rotated along a right and left direction with respect to a center axis (B) of the steering shaft 394a. After that, a center axis (C) of the second gear 410 may perform rotational movement that draws a cone having a vertex formed by a point of intersection between the center axis (A) of the handle stem 11 and the center axis (B) of the steering shaft 394a.

Here, when the center axis (A) of the handles stem 11 is repeating the right and left direction rotation at a small acute angle, a lower end of the center axis (C) of the second gear 410 may be moving along a predetermined portion of a circular arc possessed by a lower circular sectional area (C) of the cone.

At this time, the second gear 410 may be connected to the first power transmission member 420 and the length of the first power transmission member 420 may be variable along the moving direction of the second gear 410.

In detail, the inner spline 422 provided in the first power transmission member 420 may be lengthened as much as the second gear 410 is moved, while sliding with the outer spline 423.

At this time, if the crank handle 13 is rotated on the main shaft 21, the second gear 410 may be rotated. When the second gear 410 is rotated, the inner spline 422 and the outer spline 423 may be rotated with engaging with each other.

Figure 15:
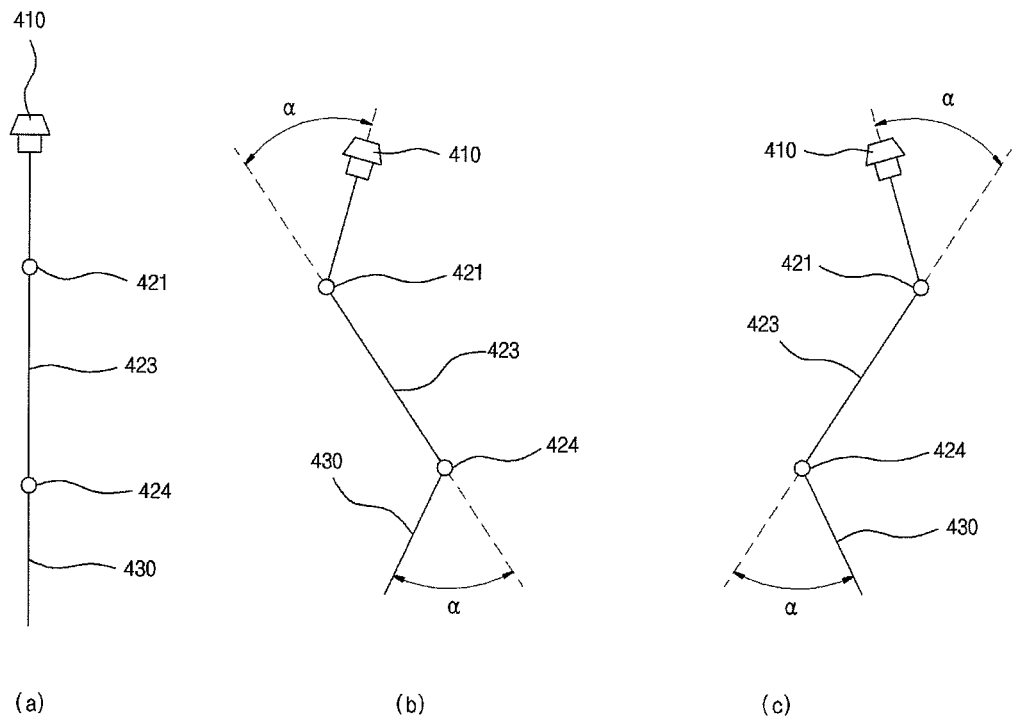
FIG. 15 is a diagram illustrating a state of a first power transmitting member, when the combined-drive bicycle according to the second embodiment of the present invention moves along a linear direction (a), when the moving direction is changed into a right direction (b) and when it is changed into a left direction (c)
Figure 16:
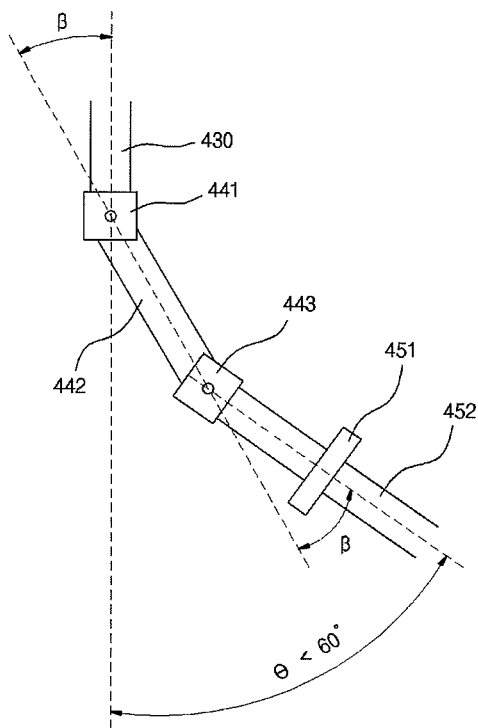
FIG. 16 is a diagram illustrating a state of a second power transmitting member.

FIG. 15 is a diagram illustrating a state of a first power transmitting member, when the combined-drive bicycle according to the second embodiment of the present invention moves along a linear direction (a), when the moving direction is changed into a right direction (b) and when it is changed into a left direction (c). FIG. 16 is a diagram illustrating a state of a second power transmitting member.

In reference to FIGS. 12 to 16, when the combined-drive bicycle 200 is moving linearly, the second gear 410, the first universal joint 421, the outer spline 423, the second universal joint 424 and the intermediate connection member 430 may be positioned linearly as shown in FIG. 15 (a). At this time, the inner spline 422 may be positioned in the outer spline 423.

When the handle assembly 10 is rotated along a right direction, the second gear 410 may be rotated along a right direction as shown in FIG. 4 and FIG. 5 (a) and the first universal joint 421 may be bending to enable the outer spline 423 to form a preset angle (α) with respect to the center axis (C) of the second gear 410.

At this time, the inner spline 422 may be moving outside the outer spline 423, while sliding with the outer spline 423.

In other words, the total length of the inner and outer splines 422 and 423 may be enlarged.

Also, the second universal joint 424 may be bending to enable the center lines of the inner spline 422 and the outer spline 423 to have the angle (α) with respect to the intermediate connection member 430.

That is, the input side angle formed by the center axis of the outer and the center axis (C) of the second gear 410 may be maintained to be identical to the output side angle formed by the center axis of the outer spline 423 and the center axis of the intermediate connection member 430, only to form the cardan joint capable of transmitting the uniform rotation speed.

In the meanwhile, when the handle of the combined-drive bicycle is rotated along the left direction, the second gear 410 may be rotated along the right direction and the first universal joint 421 may be bending to enable the center axis of the outer spline 423 to be inclined a preset angle (α) with respect to the center axis (C) of the second gear 410, as shown in FIG. 14 and FIG. 15 (a).

At this time, the inner spline 422 may be moving out of the outer spline 423, while sliding together with the outer spline 423.

In other words, the total length of the inner and outer splines 422 and 423 may be enlarged.

Also, the second universal joint 424 may be bending to enable the center lines of the inner and outer splines 422 and 423 to have the angle (α) with respect to the intermediate connection member 430.

That is, the input side angle formed by the center axis of the outer spline 423 and the center axis (C) of the second gear 410 may be maintained to be identical to the output side angle formed by the center axis of the outer spline 423 and the center axis of the intermediate connection member 430.

FIGS. 15 (b) and (c) are 2-dimensional views illustrating angle change generated in the center axis of the first power transmission member in 3-dimension. The input angle formed by the center axis of the outer spline 423 and the center axis (C) of the second gear 410 may be identical to the output angle formed by the center axis of the outer spline 423 and the center axis of the intermediate member 430, on different planes.

In the meanwhile, to transmit the handle motive force transmitted to the intermediate connection member 430 to the lower rotation shaft 452, the center axis of power transmission has to be bent one more time. For that, the second power transmission member 440 may be a cardan joint, for example.

When connecting the intermediate connection member 430 with the second power transmission member 440, as shown in FIG. 16, the center axis of the intermediate connection member 430 may be bent a preset angle (β) with respect to the joint middle shaft 442 by the third universal joint 441 and the joint middle shaft 442 may be bent a preset angle (β) with respect to the lower rotation shaft 452 by the fourth universal joint 443.

In other words, the length of the joint middle shaft 442 may be adjusted to maintain the input angle formed by the center axis of the intermediate connection member 430 and the joint middle shaft 442 identical to the output angle formed by the joint middle shaft 442 and the lower rotation shaft 452.

At this time, the angle formed by the lower rotation shaft 452 and the joint middle shaft 442 may be adjusted to be smaller than 60°. Because of that, an allowable bending angle of the third and fourth universal joints 441 and 443 may be maintained smaller than 30°.

The cardan joint may be provided at the position where the center axis of power transmission is bent one more time and the rotational force may be transmitted as the shaft is rotated at a uniform speed accordingly.

As a result, the handle motive force generated as the crank handle (13, see FIG. 9) may be transmitted to the pedal assembly (40, see FIG. 9) via the main shaft (21, see FIG. 10), the first gear (26, see FIG. 10), the second gear 410 and the motive force transmission part 300.

As described above, the present invention should not be limited to the embodiments mentioned above and it should be understood that numerous other modifications and embodiments can be devised by those skilled in the art that will fall within the spirit and scope of the principles of this disclosure.

The invention claimed is:

1. A combined-drive bicycle comprising:
   a handle assembly configured to steer a front wheel, the handle assembly comprising a crank handle to generate a handle motive force and a first gear rotated by a rotation of the crank handle;
   a pedal assembly configured to transmit the handle motive force and a pedal motive force generated by pedals to a rear wheel selectively or simultaneously; and a motive force transmission part to transmit the handle motive force to the pedal assembly, irrelevant to a steering of the handle assembly,
wherein the motive force transmission part comprises,
a second gear engaged with the first gear and rotatable with the first gear, the second gear movable with a handle stem with respect to a bicycle frame when the handle assembly is steered;
a first power transmission member rotatable, with a variable length based on the movement of the second gear; and
a lower shaft configured to transmit the rotational force of the first power transmission member to the pedal assembly.

2. The combined-drive bicycle according to claim 1, wherein the motive force transmission part further comprises,
an intermediate connection member connected to the first power transmission member; and
a second power transmission member having an end connected to the intermediate connection member and the other opposite end connected to the lower rotation shaft.

3. The combined-drive bicycle according to claim 2, wherein the first power transmission member comprises,
a first universal joint coupled to the second gear;
an inner spline coupled to the first universal joint;
an outer spline sliding-rotated with the inner spline; and
a second universal joint having an end coupled to the outer spline and the other opposite end coupled to an end of the intermediate connection member.

4. The combined-drive bicycle according to claim 3, wherein the second power transmission member comprises,
a third universal joint coupled to the other opposite end of the intermediate connection member;
a joint middle shaft coupled to the third universal joint; and
a fourth universal joint having an end coupled to the joint middle shaft and the other opposite end coupled to the lower rotation shaft.

5. The combined-drive bicycle according to claim 4, further comprising:
a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

6. The combined-drive bicycle according to claim 3, wherein at least one guide projection is formed along an outer circumferential surface of the inner spline and at least one projection accommodating recess to engaging with the at least one guide projection is formed along an inner circumferential surface of the outer spline, to enable the inner spline and the outer spline to be rotated together, with sliding-moving linearly together.

7. The combined-drive bicycle according to claim 6, further comprising:
a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

8. The combined-drive bicycle according to claim 3, further comprising:
a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

9. The combined-drive bicycle according to claim 2, wherein the intermediate connection member comprises a connection member guide passing through the upper frame to prevent the intermediate connection member from shaking.

10. The combined-drive bicycle according to claim 2, further comprising:
a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

11. The combined-drive bicycle according to claim 1, further comprising:
a projected connection part projected from the handle assembly, a steering shaft connection part projected from the steering shaft and a coupling bolt configured to couple the projected connection part and the steering connection part to each other, to locate a center of the handle stem on an extended line from a center of the steering shaft.

12. The combined-drive bicycle according to claim 11, further comprising:
a steering frame comprising the steering shaft provided therein; an upper frame having a predetermined side extended from the steering frame and the other opposite side coupled to a main frame; and a lower frame provided under the upper frame, having a predetermined side extended from the steering frame and the other opposite side connected to the pedal assembly, the lower frame comprising the lower rotation shaft provided therein.

13. The combined-drive bicycle according to claim 1, wherein the pedal assembly comprises,
a pedal part crank-rotated to rotate a pedal shaft;
a pedal hub comprising a third gear coupled to the motive force transmission part to be rotated by the handle motive force, an independent shaft independently rotated from the pedal shaft, and a fourth gear coupled to the third gear; and
a sprocket unit configured to selectively or simultaneously transmit the handle motive force and the pedal motive force transmitted from the pedal part and the pedal hub, respectively, with being rotated to transmit a rotational force to the rear wheel.

14. The combined-drive bicycle according to claim 13, wherein the sprocket unit comprises,
a sprocket for transmitting a driven power to the rear wheel;
a first one-way clutch coupled to a predetermined side of the sprocket, to provide the pedal motive force to the sprocket along a predetermined direction; and
a second one-way clutch coupled to the other opposite side of the sprocket, and rotated independently from the first one-way clutch to provide the handle motive force to the sprocket along a predetermined direction.

15. The combined-drive bicycle according to claim 14, wherein the first gear, the second gear, the third gear and the fourth gear are bevel gears, and
the rotation rate of the first gear to the second gear to the third gear to the fourth gear is 1:1:1:1.

16. The combined-drive bicycle according to claim 1, wherein the handle assembly comprises,
the handle stem having a main shaft; and
a handle hub provided in a center of the main shaft to transmit the handle motive force to the motive force transmission part,
wherein the crank handle provided in each end of the handle in order to rotate the main shaft.

17. A combined-drive bicycle comprising:
a handle assembly configured to steer a front wheel, the handle assembly comprising a crank handle to generate a handle motive force and a first gear rotated by a rotation of the crank handle;
a pedal assembly configured to transmit the handle motive force and a pedal motive force generated by pedals to a rear wheel selectively or simultaneously; and
a motive force transmission part to transmit the handle motive force to the pedal assembly, irrelevant to a steering of the handle assembly, wherein an end of the motive force transmission part is connected to a second gear being coupled to the first gear,
wherein, the pedal assembly comprises,
a pedal part to rotate a pedal shaft;
a pedal hub comprising a third gear coupled to the motive force transmission part to be rotated by the handle motive force, an independent shaft independently rotated from the pedal shaft, and a fourth gear coupled to the third gear and the independent shaft; and
a sprocket unit configured to selectively or simultaneously transmit the handle motive force and the pedal motive force transmitted from the pedal part and the pedal hub, respectively, with being rotated to transmit a rotational force to the rear wheel,
wherein, the sprocket unit comprises,
a sprocket for transmitting a driven power to the rear wheel;
a first one-way clutch coupled to a predetermined side of the sprocket and the pedal part to provide the pedal motive force to the sprocket along a predetermined direction; and
a second one-way clutch coupled to the other opposite side of the sprocket and the independent shaft, and rotated independently from the first one-way clutch to provide the handle motive force to the sprocket along a predetermined direction.

18. The combined-drive bicycle according to claim 17, wherein the pedal assembly further comprises a bearing provided between the independent shaft and the pedal shaft to enable the pedal shaft to be rotated within the independent shaft smoothly, and the pedal part further comprises a first rod and a second rod provided at both ends of the pedal shaft, respectively.

* * * * *